United States Patent
Duelo Riu et al.

(10) Patent No.: US 12,516,300 B2
(45) Date of Patent: *Jan. 6, 2026

(54) TOPICAL COMPOSITIONS COMPRISING DIAMINOOXIDASE FOR THE TREATMENT OR PREVENTION OF DISEASES ASSOCIATED WITH HIGH HISTAMINE LEVELS WHICH INVOLVE AN INCREASE IN PAIN

(71) Applicant: DR HEALTHCARE ESPAÑA, S.L., Barcelona (ES)

(72) Inventors: Carlos Duelo Riu, Barcelona (ES); Juan José Duelo Riu, Barcelona (ES)

(73) Assignee: DR HEALTHCARE ESPANA, S.L., Barcelona (ES)

( * ) Notice: Subject to any disclaimer, the term of this patent is extended or adjusted under 35 U.S.C. 154(b) by 192 days.

This patent is subject to a terminal disclaimer.

(21) Appl. No.: 17/717,532

(22) Filed: Apr. 11, 2022

(65) Prior Publication Data

US 2022/0235334 A1 Jul. 28, 2022

Related U.S. Application Data

(63) Continuation of application No. 16/813,089, filed on Mar. 9, 2020, now abandoned, which is a continuation of application No. 14/871,694, filed on Sep. 30, 2015, now abandoned, which is a continuation-in-part of application No. 14/005,109, filed as application No. PCT/IB2012/051252 on Mar. 15, 2012, now abandoned.

(30) Foreign Application Priority Data

Mar. 18, 2011 (ES) .............................. ES201130381

(51) Int. Cl.
*C12N 9/06* (2006.01)
*A61K 9/00* (2006.01)
*A61K 9/70* (2006.01)
*A61K 38/44* (2006.01)
*A61K 47/10* (2017.01)
*A61K 47/14* (2017.01)
*A61K 47/24* (2006.01)
*A61K 47/32* (2006.01)
*A61K 47/44* (2017.01)

(52) U.S. Cl.
CPC .......... *C12N 9/0022* (2013.01); *A61K 9/0014* (2013.01); *A61K 9/7046* (2013.01); *A61K 38/44* (2013.01); *A61K 47/10* (2013.01); *A61K 47/14* (2013.01); *A61K 47/24* (2013.01); *A61K 47/32* (2013.01); *A61K 47/44* (2013.01); *C12Y 104/03022* (2013.01)

(58) Field of Classification Search
CPC .............................. A61K 38/44; A61K 9/0014
See application file for complete search history.

(56) References Cited

U.S. PATENT DOCUMENTS

2008/0193491 A1* 8/2008 Missbichler ........... A61K 38/44
424/94.63
2009/0274748 A1* 11/2009 Kawamura ........... A61L 24/046
424/448

OTHER PUBLICATIONS

Lucas et al (Int J Immunopathol Pharmacol, 2006, vol. 19, pp. 5-10) (Year: 2006).*

* cited by examiner

*Primary Examiner* — Mark V Stevens
(74) *Attorney, Agent, or Firm* — Shackelford, McKinley & Norton, LLP

(57) ABSTRACT

The present invention relates to a pharmaceutical, cosmetic or dermo-cosmetic composition that comprises DAO, for use in the prevention or treatment of diseases or pathological conditions associated with high levels of histamine in blood which involve an increase in pain, preferably fibromyalgia, characterised in that the application of the composition is topical.

13 Claims, No Drawings

TOPICAL COMPOSITIONS COMPRISING DIAMINOOXIDASE FOR THE TREATMENT OR PREVENTION OF DISEASES ASSOCIATED WITH HIGH HISTAMINE LEVELS WHICH INVOLVE AN INCREASE IN PAIN

This patent application is a continuation of U.S. patent application Ser. No. 16/813,089. U.S. patent application Ser. No. 16/813,089 is a continuation of U.S. patent application Ser. No. 14/871,694. U.S. patent application Ser. No. 14/871,694 is a continuation-in-part of U.S. patent application Ser. No. 14/005,109. U.S. patent application Ser. No. 14/005,109 is a national-stage filing of International Patent Application No. PCT/IB2012/051252. U.S. patent application Ser. Nos. 16/813,089, 14/871,694 and 14/005,109 and International Patent Application No. PCT/IB2012/051252 are incorporated by reference.

FIELD OF THE INVENTION

The present invention relates to topical pharmaceutical, cosmetic or dermo-cosmetic compositions comprising diaminooxidase (DAO) for the treatment or prevention of diseases and pathological conditions associated with high levels of histamine in blood which involve an increase in pain, in particular for the treatment or prevention of migraine, fibromyalgia, spondylitis and muscle contractures.

BACKGROUND OF THE INVENTION

Histamine [2-(4-imidazolyl)-ethylamine] is an important mediator in many biological processes, including inflammation, the secretion of gastric acid, neuromodulation and regulation of the immune function. Due to its potent pharmacological activity, even at very low concentrations it is necessary to carefully regulate the synthesis, transport, storage, release and degradation of histamine in order to prevent undesirable reactions. High concentrations of free circulating histamine trigger undesirable effects, such as headaches, nasal congestion or rhinorrhea, respiratory tract obstruction, tachycardia, gastric and intestinal ailments, swelling of the eyelids, cutaneous erythemas, low blood pressure, bronchospasms, etc.

Histamine is produced by human beings and stored in inactive form in the metachromatic granules of mastocytes and basophilic leukocytes, where it is available for immediate release. The highest concentrations of histamine are measured in the lung. Following its release, histamine becomes an extraordinarily potent mediator in numerous physiological and pathophysiological processes, often also by interacting with cytokines.

Histamine may also enter into the human body from the exterior, since it is generated by microbiological action during the processing of foods and, therefore, is present in considerable quantities in many fermented foods and beverages, such as cheese, wine, tinned fish and fermented cabbage.

In addition to histamine-rich foods, many foods, such as, for example, citrus foods, are considered to be capable of releasing histamine directly from the tissue mastocytes, although in themselves they may contain only small quantities of histamine.

Histamine is formed by the decarboxylation of the amino acid L-histidine in a reaction catalysed by the enzyme histidine decarboxylase (HDC). The primary pathways for histamine inactivation in mammals are methylation of the imidazole ring, catalysed by histamine-N-methyltransferase (NMT), to produce N-methylhistamine, and oxidative deamination of the primary amino group, catalysed by diaminooxidase (DAO), to produce imidazole acetaldehyde.

Both degradation pathways are essential for the body: DAO eliminates the histamine which, for example, was absorbed in the intestinal tract through the diet and NMT controls the transmission of histaminergic signals in the nervous system.

The main function of DAO is to prevent the histamine ingested through the diet from reaching the blood flow from the intestine.

In addition to histamine, DAO may degrade other biogenic amines, such as, for example, putrescine, spermidine and cadaverine. It has a molecular weight of approximately 182 kDa and a proportion of carbohydrates of 11% It belongs to the class of aminooxidases that contain copper and which catalyse the oxidative deamination of primary amines to produce aldehydes, ammonia and hydrogen peroxide. DAO uses molecular oxygen to oxidatively deaminate histamine to imidazole acetaldehyde, ammonia and hydrogen peroxide.

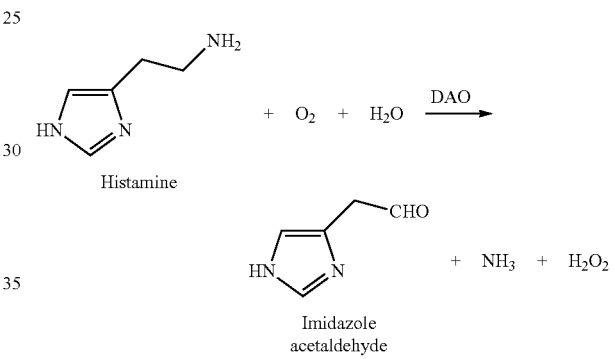

DAO is primarily found in the small intestine, the liver, the kidneys and the blood leukocytes. Pregnant women have a blood level of DAO approximately 500 to 1000 times higher than non-pregnant women, since, in the former, DAO is additionally formed in the placenta. Histamine is constantly produced in human beings and is excreted by the intestinal route, being degraded by the DAO found in the intestinal mucous membrane when it passes therethrough.

DAO is a sensitive enzyme, which may be inhibited by different substances, such as other biogenic amines, alcohol and its degradation product, acetaldehyde, as well as different medicaments.

Patents FR 2215944, of 1973, and FR 2101095, of 1970, disclose pharmaceutical compositions comprising DAO obtained from the human placenta for the treatment of allergic diseases.

Patent EP 132674, of 1983, discloses a process for the enzymatic separation of free amines from edible substances with a high content thereof, such as chocolate, cheese, especially cured cheese, salami, wine and yeast extracts, by using aminooxidase enzymes, in particular the DAO obtained from Aspergillus niger organisms, in the presence of molecular oxygen. The presence of these free amines in certain foods is considered to be a cause of migraines.

Patent US 4725540, of 1985, discloses a process for preparing DAO from a microorganism that produces it, such as Candida crusei or a bacterium that produces lactic acid in a nutrient medium, such that the DAO produced is capable of degrading histamine to a pH ranging between neutral and approximately 4.

Patent application WO 02/43745, of 2001, discloses the systemic use of DAO of vegetable origin for the treatment of histamine-mediated diseases, in particular for the treatment of allergies in general and anaphylactic reactions in particular. It also discloses pharmaceutical compositions that comprise DAO as the active principle, as well as the corresponding dosages and administration protocols. The compositions disclosed in this document are injectable, and the document does not consider topical compositions or the use thereof for the treatment of migraines or other painful pathologies, such as fibromyalgia, spondylitis and muscle contractures.

Patent application WO 2006003213, of 2005, relates to pharmaceutical compositions designed for the treatment of histamine-induced diseases, which comprise DAO of animal origin, and the composition is presented for administration by oral or peroral route, in an administration form protected against gastric acid. In particular, the compositions are aimed at treating urticaria, atopic dermatitis and scombrotoxism. The high acid content in the stomach adversely affects the activity of DAO; for this reason, in this patent DAO is protected from gastric acid such that it may reach the intestinal tract unaltered. This patent application prefers to use DAO of non-vegetable origin; this is justified by the advantage that the allergens present in plants do not adversely affect the administration of DAO, since allergens essentially promote the release of endogenous histamine. The DAO used is preferably obtained from pig kidneys or by recombinant techniques. This patent does not consider topical compositions or the use thereof for the treatment of migraines, or other painful pathologies, such as fibromyalgia, spondylitis and muscle contractures.

The present invention is focused on the treatment or prevention of diseases associated with high histamine levels which involve an increase in pain, such as migraine, fibromyalgia, spondylitis and muscle contractures, preferably fibromyalgia.

Fibromyalgia (FM) is a disease of unknown etiology characterized by chronic widespread pain that the patient locates in the locomotor system. Besides pain, other symptoms such as intense fatigue, sleep disturbances, paraesthesias in extremities, depression, anxiety, joint stiffness, headaches and feeling of swelling in hands, are other common clinical manifestations.

FM, defined by the ACR criteria for classification (American College of Rheumatology), is frequent in Spain with a prevalence of 2.4% of the general population older than 20 years, according to an EPISER study. In absolute numbers, around 700,000 patients are affected by FM in Spain. By gender, the prevalence among men is estimated at 0.2% against 4.2% in women, which implies a relation women/men of 21:1.

In the last few years, FM has become more important and currently is a major public health problem given its high prevalence, the lack of knowledge about causes and mechanisms, the absence of a curative treatment and the dissatisfaction of patients and professionals. This all leads to a series of consequences in health, economic and social levels.

Most recent data also indicates that in patients with FM, there is an alteration of the mechanisms of pain processing, probably caused by an imbalance in neuromodulators of the central nervous system.

On the other hand, concepts like histamine intolerance or food histaminosis have been highlighted repeatedly in recent years. Both concepts make reference to the accumulation of histamine in the organism resulting in different symptoms: migraine, headaches, general pain, gastrointestinal symptoms, dry skin, pruritus, fatigue, etc. Paradoxically, these symptoms are common in diseases such as fibromyalgia.

SUMMARY OF THE INVENTION

The problem to be solved by the present invention is the prevention or treatment of diseases or pathological conditions associated with high levels of histamine in blood which involve an increase in pain, in particular for the treatment or prevention of migraine, fibromyalgia, spondylitis and muscle contractures, preferably fibromyalgia.

The present inventors have surprisingly observed that the compositions comprising DAO of the present invention may be used to solve said problem.

The first aspect of the present invention are topical compositions comprising DAO in the form of a cream of the two-phase oil-water (o/w) and water-oil (w/o) types, or the three-phase water-oil-water (w/o/w) and oil-water-oil (o/w/o) types.

The second aspect of the present invention are topical compositions comprising DAO in the form of a serum.

The third aspect of the present invention are topical compositions comprising DAO in the form of a gel.

The fourth aspect of the present invention are topical compositions comprising DAO in the form of bioadhesive patch.

The fifth aspect of the present invention are topical compositions comprising DAO in the form of a spray.

The sixth aspect of the present invention are topical compositions comprising DAO to be applied by means of medical devices or sanitary products, such as, for example, at the front ends of anti-migraine headbands, which are placed around the head on the area where the pain is focalised, such as those protected in patent applications ES 2132037 and WO 2008/113871.

The seventh aspect of the present invention are manufacturing processes for the topical pharmaceutical compositions that comprise DAO.

The eighth aspect of the present invention is the use of the topical compositions of the present invention for the manufacturing of a medicament for the prevention or treatment of diseases or pathological conditions associated with high levels of histamine in blood which involve an increase in pain, such as migraine, fibromyalgia, spondylitis and muscle contractures. Furthermore, the present invention also relates to the topical compositions of the present invention to be used in the prevention or treatment of diseases or pathological conditions associated with high levels of histamine in blood that involve an increase in pain, in particular, migraine, fibromyalgia, spondylitis and muscle contractures, preferably fibromyalgia.

In a further aspect, the administration of the topical composition of the present invention is carried out together with a diet low in histamine-rich and/or histamine releasing food.

DETAILED DESCRIPTION OF THE INVENTION

The present invention relates to a topical pharmaceutical, cosmetic or dermo-cosmetic composition that comprises DAO, to be used in the prevention or treatment of diseases or pathological conditions associated with high levels of histamine in blood which involve an increase in pain. In particular, said diseases or pathological conditions are migraine, fibromyalgia, spondylitis and muscle contractures, preferably fibromyalgia.

The present invention also relates to the use of a pharmaceutical, cosmetic or dermo-cosmetic composition that comprises DAO for the manufacturing of a medicament for the treatment or prevention of diseases or pathological conditions associated with high levels of histamine in blood which involve an increase in pain, characterised in that the application of said composition is topical. In particular, said diseases or pathological conditions are migraine, fibromyalgia, spondylitis and muscle contractures, preferably fibromyalgia.

In the present invention, "prevention" is understood to mean avoiding the onset of a disease or pathological condition associated with high levels of histamine in blood which involves an increase in pain, in particular migraine, fibromyalgia, spondylitis and muscle contractures, preferably fibromyalgia.

In the present invention, "treatment" is understood to mean the clinical intervention designed to alter the natural evolution of an individual and which is performed during the evolution of the clinical pathology. The desirable effects of the treatment include prevention of the reappearance of the disease, alleviation of the symptoms, alleviation of any direct or indirect pathological consequence of the disease, reduction in the rate of progression of the disease, improvement or partial cure of the pathological condition and remission or improved prognosis.

The DAO used in the present invention may be of both biotechnological origin and vegetable or animal extraction.

The topical compositions comprising DAO may have a great variety of dosage forms: creams of the two-phase oil-water (o/w) and water-oil (w/o) types, or the three-phase water-oil-water (w/o/w) and oil-water-oil (o/w/o) types, sera, gels, bioadhesive patches, sprays, ointments, hydrogels, etc. Hydrogels and creams are better in terms of absorption; in particular, hydrogels that contain carboxymethyl cellulose as a base and oil-in-water creams are the especially preferred types. Ointments in general include vaseline, bases for hydrophilic ointments, bases for the absorption of oils or Macrogol bases.

The concentration of DAO in the different topical compositions may range between 0.005% and 20% by weight, the preferred concentration range being between 0.5% and 5% by weight.

A suitable medium for dissolving DAO is phosphate buffer (pH 7.2), which serves to keep the pH of the preparation within a suitable pre-determined range for stability of the DAO itself and which is not aggressive for the physiological area of application of said composition.

The fats and oils to be used include higher hydrocarbons such as, for example, liquid paraffin, vaseline, squalene, etc.; higher alcohols such as, for example, cetyl alcohol, stearyl alcohol, etc.; higher esters such as, for example, tristearyl glyceride, tripalmitoyl glyceride, distearyl glyceride, monostearyl glyceride, cholesteryl stearate, isopropyl myristate, etc.; and waxes such as, for example, bee was, Japan wax, etc.

The emulsifier to be used includes non-ionic surface active agents, such as polyoxyethylene derivatives of fats and oils, polyglycerol esters, ethers of fats and oils, sugar esters, amphoteric-surface active agents, and similar agents.

Polyhydric alcohols such as glycerin, propylene glycol, ethylene glycol, 1,3-butylene glycol, sorbitol, etc., may also be used.

The creams may be prepared by the addition of DAO powder to a mixture of the excipients, the fats potentially being in the molten state, under stirring until an oil-in-water or a water-in-oil emulsion is formed.

Another type of topical compositions covered by the present invention are flexible bioadhesive compositions for localised topical application on the area affected by pain. These bioadhesive compositions comprise: a) a therapeutically effective quantity of DAO in powder form, b) a pharmaceutically acceptable solvent in a quantity ranging between approximately 5% and approximately 70% by weight with respect to the total weight of the composition, the solvent including approximately between 5% and 50% by weight of a plasticiser, and c) a pharmaceutically acceptable bioadhesive support at a concentration ranging between approximately 20% and 50% by weight with respect to the weight of the complete composition, where the composition is substantially water-free, substantially insoluble in water and bioadhesive. The solvents used must be pharmaceutically acceptable substances, preferably liquids, which do not have a substantial adverse effect on the system's adhesion or solubility properties. The preferred solvent is a polyhydric alcohol or a combination of polyhydric alcohols. Other suitable solvents include fatty acids such as oleic acid, linoleic acid, caprylic acid and similar acids, as well as fatty esters. Other further suitable solvents include non-volatile solvents generally used in dermal or transdermal compositions for the dissolution of similar compounds. The DAO is found in "microdispersed" form in the solvent and also on the support, i.e. there is an intimate dispersion of DAO at the molecular or ionic level. The final dosage form must be substantially occlusive to the permeabilisation of water in vivo. Suitable bioadhesive supports include any non-toxic polymer, particularly those used to support drugs designed for transdermal release, such as elastomers of natural or synthetic origin, such as, for example: polyisobutylene, styrene, butadiene, styrene copolymers, urethane acrylics, silicones, polyacrylates and polysaccharides such as, for example, gum karaya, gum tragacanth, pectin, cellulose and cellulose derivatives and similar, as well as other known substances capable of forming a colloidal solid that may adhere to the tissue, preferably for application on the dermis.

The topical compositions of the present invention may be applied directly on the areas affected by pain, such as the temples (hemicranial parietals) or the frontal or occipital areas, in the case of migraine pains; the inferior cervical area, the trapezius muscles, supraspinal areas, the second rib, the gluteal muscles or the knee, in the case of fibromyalgia; the back (spine) and joints in the case of spondylitis; and the affected areas in the case of muscle contractures.

The creams may also be applied to medical devices or sanitary products, such as, for example, the front ends of anti-migraine headbands, which are placed around the head on the area where the pain is focalised. Thus, for example, the front ends of anti-migraine headbands, protected in patent applications ES 2132037 and WO 2008/113871, may contain a cavity covered by a sponge-type, porous material adapted to house a given quantity of the cream or the gel of the present invention. In particular, the headband is placed around the patient's head, exerting pressure mainly on the parietal areas and releasing the DAO of the topical composition housed in the cavity of the front ends thereof. This produces a double therapeutic effect: the pressure on the temple area exerted by the headband cushions the force of the blood as it passes through the dilated artery and the increased level of DAO in blood leads to a degradation of the excess histamine that causes the arterial vasodilation which originates the vascular cephalalgia and the migraine pain.

The present invention also relates to a treatment method that comprises administering a topical composition comprising DAO according to any of the embodiments of the present invention in a therapeutically effective quantity to patients who present diseases or pathological conditions associated with high levels of histamine in blood which involve an increase in pain, or who present the risk of suffering therefrom.

In a further aspect, the administration of the topical composition of the present invention is carried out together with a diet low in histamine-rich and/or histamine releasing food.

EXAMPLES

Example 1

A topical pharmaceutical composition was prepared in the form of an oil/water (o/w) cream containing 2% of DAO.

| Ingredients | % (weight/weight) |
| --- | --- |
| Disodium EDTA | 0.3 |
| Imidazolidinyl urea (Abiol) | 0.2 |
| Mixture of parabens in phenoxyethanol (Phenonip) | 0.85 |
| Potassium cetyl phosphate (Arlatone Map 160K) | 3 |
| Ethylhexyl cocoate (Waglinol 13088) | 2.5 |
| $C_{12}$-$C_{15}$ alkyl benzoate (Finsolv TN) | 5.0 |
| Cetearyl alcohol, cetearyl glucoside (Montanov 68) | 5.0 |
| Menthyl lactate (Frescolat) | 0.3 |
| Dimethicone (DC 200 silicone) | 1.0 |
| Tocopheryl acetate (Vitamin E acetate) | 0.5 |
| Polyacrylamide, water, $C_{13}$-$_{14}$ isoparaffin, Laureth-7 (Sepigel) | 2.0 |
| Fragrance (perfume) | 0.3 |
| DAO | 2 |
| Water | s.q. |

Example 2

A topical pharmaceutical composition was prepared in the form of a water/oil (w/o) cream containing 3% of DAO.

| Ingredients | % (weight/weight) |
| --- | --- |
| Disodium EDTA | 0.3 |
| Imidazolidinyl urea (Abiol) | 0.2 |
| Glycerin | 3.0 |
| Magnesium sulfate | 1.0 |
| *Aloe Vera* gel | 1.0 |
| Mineral oil | 15.0 |
| Ethylhexyl cocoate (Waglinol 13088) | 10.0 |
| Cera Alba (Permulgin 1550) | 1.5 |
| Mixture of parabens in phenoxyethanol (Phenonip) | 0.85 |
| Hydrogenated castor oil (Cutina HR) | 0.75 |
| Sorbitan sesquioleate (Arlacel 83) | 3.0 |
| BHT | 0.05 |
| Jojoba seed oil | 0.5 |
| Fragrance (perfume) | 0.3 |
| Magnesium sulfate | 2.0 |
| DAO | 3 |
| Water | s.q. |

Example 3

A topical pharmaceutical composition was prepared in the form of a serum containing 1.5% of DAO.

| Ingredients | % (weight/weight) |
| --- | --- |
| Disodium EDTA | 0.3 |
| Imidazolidinyl urea (Abiol) | 0.2 |
| Mixture of parabens in phenoxyethanol (Phenonip) | 0.85 |
| Water, glycerin, glyceryl polyacrylate (Hispagel) | 8.0 |
| PEG-40 hydrogenated castor oil (Cremofor CO 40) | 0.6 |
| Carbomer (Ultrez 10) | 0.5 |
| Propylene glycol | 3.0 |
| Glycerin | 5.0 |
| Butylene glycol | 1.0 |
| Fragrance (perfume) | 0.3 |
| DAO | 1.5 |
| Water | s.q. |

Example 4

A topical pharmaceutical composition was prepared in the form of a gel containing 2% of DAO.

| Ingredients | % (weight/weight) |
| --- | --- |
| Disodium EDTA | 0.3 |
| Imidazolidinyl urea (Abiol) | 0.2 |
| Mixture of parabens in phenoxyethanol (Phenonip) | 0.85 |
| Water, glycerin, glyceryl polyacrylate (Hispagel) | 40.0 |
| PEG-40 hydrogenated castor oil (Cremofor CO 40) | 0.6 |
| CI 42090 (1% FDC BLUE) | 0.05 |
| Fragrance (perfume) | 0.3 |
| DAO | 2.0 |
| Water | s.q. |

Example 5

A topical pharmaceutical composition was prepared in the form of a bioadhesive patch containing 10% of DAO, by mixing DAO with propylene glycol, lecithin and glycerin, under slight heating. It was cooled to 25° C. prior to the addition of gum karaya. After the gum karaya was added, the final composition was applied to a suitable support material, such as a non-woven polyester film, and heated in order to accelerate the formation of the gel in its final form.

| Ingredient | % (weight/weight) |
| --- | --- |
| Adhesive (gum karaya) | 35 |
| Binding agent (lecithin) | 20 |
| Solvent (propylene glycol) | 10 |
| Solvent (glycerin) | 25 |
| DAO | 10 |

Example 6

A topical pharmaceutical composition was prepared in the form of a cream containing 2% of DAO, following Example 1, and this cream was introduced into the cavities of the front ends of the MIGRACALM® anti-migraine headband, which is placed around the head on the area where the pain is focalised.

Example 7

The topical compositions comprising DAO of the present invention were assayed on a total of 72 subjects, as outpatients (45 men and 27 women between 21 and 65 years of age), suffering from migraine without aura (35 subjects), fibromyalgia (10 subjects), spondylitis (9 subjects) and muscle contractures (18 subjects). The subjects included in the study came from a prior diagnosis of migraine (pain in the hemicranial area), fibromyalgia, spondylitis or muscle contractures, in both the back and the limbs.

The following tables show the results in relation to pain relief of the different compositions of the present invention, in the different types of pain studied.

TABLE 1

Results obtained with the cream composition of Example 1

| Typology of pain | Marked improvement or complete cessation of pain (% of the total) |
|---|---|
| Migraine | 28 of 35 (80%) |
| Fibromyalgia | 7 of 10 (70%) |
| Spondylitis | 6 of 9 (66.6%) |
| Muscle contractures | 14 of 18 (77.7%) |

TABLE 2

Results obtained with the cream composition of Example 2

| Typology of pain | Marked improvement or complete cessation of pain (% of the total) |
|---|---|
| Migraine | 26 of 35 (74.3%) |
| Fibromyalgia | 6 of 10 (60%) |
| Spondylitis | 4 of 9 (44.4%) |
| Muscle contractures | 15 of 18 (83.3%) |

TABLE 3

Results obtained with the serum composition of Example 3

| Typology of pain | Marked improvement or complete cessation of pain (% of the total) |
|---|---|
| Migraine | 27 of 35 (77.1%) |
| Fibromyalgia | 6 of 10 (60%) |
| Spondylitis | 5 of 9 (5.5%) |
| Muscle contractures | 15 of 18 (83.3%) |

TABLE 4

Results obtained with the gel composition of Example 4

| Typology of pain | Marked improvement or complete cessation of pain (% of the total) |
|---|---|
| Migraine | 26 of 35 (74.3%) |
| Fibromyalgia | 6 of 10 (60%) |
| Spondylitis | 5 of 9 (55.5%) |
| Muscle contractures | 15 of 18 (83.3%) |

TABLE 5

Results obtained with the composition in bioadhesive patches of Example 5

| Typology of pain | Marked improvement or complete cessation of pain (% of the total) |
|---|---|
| Spondylitis | 6 of 9 (66.6%) |
| Muscle contractures | 16 of 18 (88.9%) |

TABLE 6

Results obtained with the cream composition of Example 1 applied to the MIGRACALM® anti-migraine headband, which was placed around the head on the area where the pain is focalised, in patients suffering from migraine attacks.

| Typology of pain | Marked improvement or complete cessation of pain (% of the total) |
|---|---|
| Migraine | 32 of 35 (91.4%) |

The invention claimed is:

1. A method of treating fibromyalgia, comprising administering a pharmaceutical, cosmetic or dermo-cosmetic topical composition comprising diaminooxidase (DAO), wherein the DAO in the composition is in a therapeutically effective concentration to treat the fibromyalgia, wherein the treatment of the fibromyalgia is characterized by prevention of the reappearance of the fibromyalgia, alleviation of the symptoms of the fibromyalgia, alleviation of any direct or indirect pathological consequence of the fibromyalgia, reduction in the rate of progression of the fibromyalgia, improvement of the fibromyalgia, remission of the fibromyalgia, improved prognosis of the fibromyalgia, or combinations thereof.

2. The method according to claim 1, wherein said composition is a cream, a serum, a gel, a hydrogel, an oil, a bioadhesive patch or a spray.

3. The method according to claim 1, wherein the DAO is in the form of a powder, a lyophilised powder, or encapsulated in a nanoparticle, microparticle or liposome.

4. The method according to claim 1, wherein the DAO is of biotechnological origin, or from a vegetable or animal extraction.

5. The method according to claim 1, wherein the DAO is from a vegetable or animal extraction.

6. The method according to claim 1, wherein the concentration of DAO in said topical composition ranges between 0.005% and 20% by weight.

7. The method according to claim 1, wherein the concentration of DAO in said topical composition ranges between 0.5% and 2% by weight.

8. The method according to claim 1, wherein said composition in the form of a patch is a flexible bioadhesive patch that comprises:
   a) a therapeutically effective quantity of DAO in powder form,
   b) a pharmaceutically acceptable solvent in a quantity ranging between approximately 5% and approximately 70% by weight with respect to the total weight of the composition, the solvent including approximately between 5% and 50% by weight of a plasticiser, and
   c) a pharmaceutically acceptable bioadhesive support at a concentration ranging between approximately 20% and 50% by weight with respect to the weight of the complete composition, where the composition is substantially water-free, substantially insoluble in water and bioadhesive.

9. The method according to claim 1, wherein said composition in the form of a cream, a serum, a gel, a hydrogel or an oil is applied to a medical device wherefrom it is released in a controlled manner to the area affected by pain.

10. The method according to claim 1, wherein said administration of the topical composition is carried out together with a diet low in histamine-rich and/or histamine releasing food.

11. The method according to claim 1, wherein the administered DAO degrades exogenous histamine.

12. The method of claim 11, wherein the exogenous histamine comprises ingested histamine.

13. The method of claim 11, wherein the composition is in the form of a topical composition, and wherein the administration of the composition comprises topical administration.

* * * * *